(12) United States Patent
Levy et al.

(10) Patent No.: US 7,436,976 B2
(45) Date of Patent: Oct. 14, 2008

(54) DIGITAL WATERMARKING SYSTEMS AND METHODS

(75) Inventors: Kenneth L. Levy, Stevenson, WA (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 678 days.

(21) Appl. No.: 10/843,866

(22) Filed: May 11, 2004

(65) Prior Publication Data

US 2005/0008190 A1 Jan. 13, 2005

Related U.S. Application Data

(60) Division of application No. 10/278,742, filed on Oct. 21, 2002, now Pat. No. 7,006,661, which is a continuation-in-part of application No. 10/017,678, filed on Dec. 13, 2001, now Pat. No. 7,050,603, which is a continuation of application No. 09/597,209, filed on Jun. 20, 2000, now Pat. No. 6,411,725, which is a continuation-in-part of application No. 09/408,902, filed on Sep. 29, 1999, now Pat. No. 6,408,331, which is a division of application No. 09/130,624, filed on Aug. 6, 1998, now Pat. No. 6,324,573, which is a continuation of application No. 08/508,083, filed on Jul. 27, 1995, now Pat. No. 5,841,978.

(60) Provisional application No. 60/349,970, filed on Oct. 19, 2001.

(51) Int. Cl.
*G06K 9/00* (2006.01)
*G06K 9/36* (2006.01)

(52) U.S. Cl. .................................. 382/100; 382/232
(58) Field of Classification Search ................. 382/100, 382/232, 233; 380/216, 217, 203, 239, 241–242; 713/150, 169–173, 181–182
See application file for complete search history.

(56) References Cited

U.S. PATENT DOCUMENTS

| | | | |
|---|---|---|---|
| 3,569,619 A | 3/1971 | Simjian | |
| 3,665,162 A | 5/1972 | Yamamoto et al. | |
| 3,703,628 A | 11/1972 | Philipson, Jr. | |
| 3,805,238 A | 4/1974 | Rothfjell | |

(Continued)

FOREIGN PATENT DOCUMENTS

DE 3806411 9/1989

(Continued)

OTHER PUBLICATIONS

Barni et al, "Object watermarking for MPEG-4 video streams copyright protection", In Security and Watermarking of Multimedia Contents II, Ping Wah Wong, Edward J. Deip, Editors, Proceedings of SPIE vol. 3971 (2000).*

(Continued)

*Primary Examiner*—Andrew W. Johns
*Assistant Examiner*—Andrae S Allison

(57) ABSTRACT

The present invention relates watermarking compressed objects. A watermark is determined for a compressed video object. The watermark is compressed as an object and the watermarked object is then associated with the compressed video object. The two separate objects are provided to a rendering device, which after decompressing both objects, embeds the watermark in the video prior to rendering.

16 Claims, 3 Drawing Sheets

U.S. PATENT DOCUMENTS

| | | |
|---|---|---|
| 3,838,444 A | 9/1974 | Loughlin et al. |
| 3,845,391 A | 10/1974 | Cosby |
| 3,891,829 A | 6/1975 | Dobras |
| 3,894,756 A | 7/1975 | Ward |
| 3,914,877 A | 10/1975 | Hines |
| 3,922,074 A | 11/1975 | Ikegami et al. |
| 3,984,624 A | 10/1976 | Waggener |
| 4,028,733 A | 6/1977 | Ulicki |
| 4,131,367 A | 12/1978 | French et al. |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,313,197 A | 1/1982 | Maxemchuk |
| 4,325,083 A | 4/1982 | Rouchon et al. |
| 4,345,011 A | 8/1982 | Drexhage |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,414,635 A | 11/1983 | Gast et al. |
| 4,423,415 A | 12/1983 | Goldman |
| 4,425,642 A | 1/1984 | Moses et al. |
| 4,476,468 A | 10/1984 | Goldman |
| 4,528,588 A | 7/1985 | Lofberg |
| 4,532,508 A | 7/1985 | Ruell |
| 4,547,074 A | 10/1985 | Hinoda et al. |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,597,495 A | 7/1986 | Knosby |
| 4,637,051 A | 1/1987 | Clark |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | D'Agraives et al. |
| 4,679,068 A | 7/1987 | Lillquist et al. |
| 4,682,794 A | 7/1987 | Margolin |
| 4,703,476 A | 10/1987 | Howard |
| 4,712,103 A | 12/1987 | Gotanda |
| 4,718,106 A | 1/1988 | Weinblatt |
| 4,739,377 A | 4/1988 | Allen |
| 4,750,173 A | 6/1988 | Bluthgen |
| 4,751,571 A | 6/1988 | Lillquist |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,829,569 A | 5/1989 | Seth-Smith et al. |
| 4,835,517 A | 5/1989 | van der Gracht et al. |
| 4,855,725 A | 8/1989 | Fernandez |
| 4,855,827 A | 8/1989 | Best |
| 4,864,618 A | 9/1989 | Wright et al. |
| 4,866,771 A | 9/1989 | Bain |
| 4,876,617 A | 10/1989 | Best et al. |
| 4,879,747 A | 11/1989 | Leighton et al. |
| 4,884,139 A | 11/1989 | Pommier |
| 4,888,798 A | 12/1989 | Earnest |
| 4,903,301 A | 2/1990 | Kondo et al. |
| 4,908,836 A | 3/1990 | Rushforth et al. |
| 4,908,873 A | 3/1990 | Philibert et al. |
| 4,917,500 A | 4/1990 | Lugos |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,947,028 A | 8/1990 | Gorog |
| 4,963,998 A | 10/1990 | Maufe |
| 4,965,449 A | 10/1990 | Suzuki et al. |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,990,092 A | 2/1991 | Cummings |
| 4,993,068 A | 2/1991 | Piosenka et al. |
| 4,996,530 A | 2/1991 | Hilton |
| 4,998,010 A | 3/1991 | Chandler et al. |
| 5,010,405 A | 4/1991 | Schreiber et al. |
| 5,023,907 A | 6/1991 | Johnson |
| 5,027,401 A | 6/1991 | Soltesz |
| 5,036,513 A | 7/1991 | Greenblatt |
| 5,047,614 A | 9/1991 | Bianco |
| 5,053,956 A | 10/1991 | Donald et al. |
| 5,059,126 A | 10/1991 | Kimball |
| 5,063,446 A | 11/1991 | Gibson |
| 5,073,899 A | 12/1991 | Collier et al. |
| 5,079,648 A | 1/1992 | Maufe |
| 5,086,469 A | 2/1992 | Gupta et al. |
| 5,095,196 A | 3/1992 | Miyata |
| 5,103,459 A | 4/1992 | Gilhousen et al. |
| 5,113,518 A | 5/1992 | Durst |
| 5,138,712 A | 8/1992 | Corbin |
| 5,146,457 A | 9/1992 | Veldhuis et al. |
| 5,148,498 A | 9/1992 | Resnikoff |
| 5,150,409 A | 9/1992 | Elsner |
| 5,161,210 A | 11/1992 | Druyvesteyn et al. |
| 5,166,676 A | 11/1992 | Milheiser |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,202,828 A | 4/1993 | Vertelney et al. |
| 5,212,551 A | 5/1993 | Conanan |
| 5,213,337 A | 5/1993 | Sherman |
| 5,228,056 A | 7/1993 | Schilling |
| 5,229,841 A | 7/1993 | Taranowski et al. |
| 5,243,423 A | 9/1993 | DeJean et al. |
| 5,245,329 A | 9/1993 | Gokcebay |
| 5,253,078 A | 10/1993 | Balkanski et al. |
| 5,258,998 A | 11/1993 | Koide |
| 5,259,025 A | 11/1993 | Monroe |
| 5,262,860 A | 11/1993 | Fitzpatrick |
| 5,267,334 A | 11/1993 | Normille et al. |
| 5,280,537 A | 1/1994 | Sugiyama et al. |
| 5,288,976 A | 2/1994 | Citron |
| 5,293,399 A | 3/1994 | Hefti |
| 5,295,203 A | 3/1994 | Krause et al. |
| 5,298,731 A | 3/1994 | Ett |
| 5,299,019 A | 3/1994 | Pack et al. |
| 5,303,388 A | 4/1994 | Kreitman et al. |
| 5,305,400 A | 4/1994 | Butera |
| 5,315,098 A | 5/1994 | Tow |
| 5,319,453 A | 6/1994 | Copriviza |
| 5,319,724 A | 6/1994 | Blonstein et al. |
| 5,319,735 A | 6/1994 | Preuss et al. |
| 5,325,167 A | 6/1994 | Melen |
| 5,337,358 A | 8/1994 | Axelrod et al. |
| 5,339,095 A | 8/1994 | Redford |
| 5,341,293 A | 8/1994 | Vertelney et al. |
| 5,351,302 A | 9/1994 | Leighton et al. |

| | | | | | | |
|---|---|---|---|---|---|---|
| 5,379,345 A | 1/1995 | Greenberg | | 5,822,432 A | 10/1998 | Moskowitz et al. |
| 5,385,371 A | 1/1995 | Izawa | | 5,828,325 A | 10/1998 | Wolosewicz et al. |
| 5,394,274 A | 2/1995 | Kahn | | 5,841,978 A | 11/1998 | Rhoads |
| 5,404,377 A | 4/1995 | Moses | | 5,845,281 A | 12/1998 | Benson |
| 5,408,542 A | 4/1995 | Callahan | | 5,848,413 A | 12/1998 | Wolff |
| 5,413,486 A | 5/1995 | Burrows et al. | | 5,848,424 A | 12/1998 | Scheinkman |
| 5,422,963 A | 6/1995 | Chen et al. | | 5,852,673 A | 12/1998 | Young |
| 5,422,995 A | 6/1995 | Aoki et al. | | 5,857,038 A | 1/1999 | Owada et al. |
| 5,428,607 A | 6/1995 | Hiller et al. | | 5,862,260 A | 1/1999 | Rhoads |
| 5,428,731 A | 6/1995 | Powers | | 5,862,321 A | 1/1999 | Lamming et al. |
| 5,432,870 A | 7/1995 | Schwartz | | 5,869,819 A | 2/1999 | Knowles et al. |
| 5,437,552 A | 8/1995 | Baer et al. | | 5,872,589 A | 2/1999 | Morales |
| 5,446,273 A | 8/1995 | Leslie | | 5,886,337 A | 3/1999 | Rockstein et al. |
| 5,450,490 A | 9/1995 | Jensen et al. | | 5,892,900 A | 4/1999 | Ginter et al. |
| 5,452,414 A | 9/1995 | Rosendahl et al. | | 5,893,910 A | 4/1999 | Martineau |
| 5,459,489 A | 10/1995 | Redford | | 5,896,454 A | 4/1999 | Cookson et al. |
| 5,461,711 A | 10/1995 | Wang et al. | | 5,901,178 A | 5/1999 | Lee et al. |
| 5,463,209 A | 10/1995 | Figh | | 5,905,248 A | 5/1999 | Russell et al. |
| 5,466,158 A | 11/1995 | Smith, III | | 5,915,027 A | 6/1999 | Cox et al. |
| 5,469,506 A | 11/1995 | Berson et al. | | 5,920,861 A | 7/1999 | Hall |
| 5,473,631 A | 12/1995 | Moses | | 5,920,878 A | 7/1999 | DeMont |
| 5,479,168 A | 12/1995 | Johnson et al. | | 5,926,822 A | 7/1999 | Garman |
| 5,484,292 A | 1/1996 | McTaggart | | 5,932,863 A | 8/1999 | Rathus |
| 5,493,677 A | 2/1996 | Balogh | | 5,949,885 A | 9/1999 | Leighton |
| 5,495,411 A | 2/1996 | Ananda | | 5,974,141 A | 10/1999 | Saito |
| 5,495,581 A | 2/1996 | Tsai | | 5,983,218 A | 11/1999 | Syeda-Mahmood |
| 5,496,071 A | 3/1996 | Walsh | | 5,991,500 A | 11/1999 | Kanota et al. |
| 5,499,294 A | 3/1996 | Friedman | | 5,991,876 A | 11/1999 | Johnson |
| 5,515,081 A | 5/1996 | Vasilik | | 6,021,491 A | 2/2000 | Renaud |
| 5,524,933 A | 6/1996 | Kunt et al. | | 6,031,815 A | 2/2000 | Heemskerk |
| 5,525,798 A | 6/1996 | Berson et al. | | 6,078,664 A | 6/2000 | Moskowitz et al. |
| 5,530,852 A | 6/1996 | Meske, Jr. et al. | | 6,081,827 A | 6/2000 | Reber et al. |
| 5,537,336 A | 7/1996 | Joyce | | 6,141,753 A | 10/2000 | Zhao et al. |
| 5,545,883 A | 8/1996 | Sasou et al. | | 6,177,931 B1 | 1/2001 | Alexander et al. |
| 5,548,645 A | 8/1996 | Ananda | | 6,226,387 B1 | 5/2001 | Tewfik et al. |
| 5,553,143 A | 9/1996 | Ross | | 6,256,638 B1 | 7/2001 | Dougherty |
| 5,569,549 A | 10/1996 | Redford | | 6,263,087 B1 | 7/2001 | Miller |
| 5,579,124 A | 11/1996 | Aijala et al. | | 6,269,394 B1 | 7/2001 | Kenner et al. |
| 5,579,479 A | 11/1996 | Plum | | 6,272,634 B1 | 8/2001 | Tewfik et al. |
| 5,586,216 A | 12/1996 | Degen et al. | | 6,278,792 B1 * | 8/2001 | Cox et al. ............ 382/100 |
| 5,587,784 A | 12/1996 | Pines et al. | | 6,298,142 B1 | 10/2001 | Nakano |
| 5,597,307 A | 1/1997 | Redford et al. | | 6,310,962 B1 | 10/2001 | Chung et al. |
| 5,604,516 A | 2/1997 | Herrod et al. | | 6,324,573 B1 | 11/2001 | Rhoads |
| 5,606,609 A | 2/1997 | Houser et al. | | 6,330,672 B1 | 12/2001 | Shur |
| 5,613,004 A | 3/1997 | Cooperman et al. | | 6,359,998 B1 | 3/2002 | Cooklev |
| 5,624,265 A | 4/1997 | Redford et al. | | 6,366,998 B1 | 4/2002 | Mohamed |
| 5,629,980 A | 5/1997 | Stefik | | 6,398,245 B1 | 6/2002 | Gruse et al. |
| 5,634,012 A | 5/1997 | Stefik | | 6,408,331 B1 * | 6/2002 | Rhoads ............ 709/217 |
| 5,636,276 A | 6/1997 | Brugger | | 6,411,725 B1 * | 6/2002 | Rhoads ............ 382/100 |
| 5,638,443 A | 6/1997 | Stefik | | 6,449,377 B1 | 9/2002 | Rhoads |
| 5,640,193 A | 6/1997 | Wellner | | 6,493,457 B1 | 12/2002 | Quackenbush |
| 5,646,997 A | 7/1997 | Barton | | 6,535,614 B1 | 3/2003 | Kimura et al. |
| 5,646,999 A | 7/1997 | Saito | | 6,574,350 B1 | 6/2003 | Rhoads et al. |
| 5,650,608 A | 7/1997 | Redford et al. | | 6,587,944 B2 | 7/2003 | Yeung et al. |
| 5,652,626 A | 7/1997 | Kawakami et al. | | 6,590,997 B2 | 7/2003 | Rhoads |
| 5,652,714 A | 7/1997 | Peterson | | 6,738,495 B2 | 5/2004 | Rhoads et al. |
| 5,657,462 A | 8/1997 | Brouwer | | 6,757,407 B2 | 6/2004 | Bruckstein et al. |
| 5,659,164 A | 8/1997 | Schmid | | 6,987,862 B2 | 1/2006 | Rhoads |
| 5,663,766 A | 9/1997 | Sizer, II | | 7,006,661 B2 * | 2/2006 | Miller et al. ............ 382/100 |
| 5,689,587 A | 11/1997 | Bender et al. | | 7,050,603 B2 | 5/2006 | Rhoads |
| 5,693,693 A | 12/1997 | Auslander et al. | | 7,058,697 B2 * | 6/2006 | Rhoads ............ 709/217 |
| 5,715,403 A | 2/1998 | Stefik | | 7,062,068 B2 | 6/2006 | Hirai et al. |
| 5,721,788 A | 2/1998 | Powell | | 7,197,156 B1 | 3/2007 | Levy |
| 5,729,251 A | 3/1998 | Nakashima | | 7,289,643 B2 * | 10/2007 | Brunk et al. ............ 382/100 |
| 5,734,119 A | 3/1998 | France | | 7,313,251 B2 * | 12/2007 | Rhoads ............ 382/100 |
| 5,739,814 A | 4/1998 | Ohara et al. | | 7,373,513 B2 | 5/2008 | Levy |
| 5,745,569 A | 4/1998 | Moskowitz et al. | | 2001/0016052 A1 | 8/2001 | Miller |
| 5,765,152 A | 6/1998 | Erickson | | 2003/0035565 A1 | 2/2003 | Rhoads |
| 5,774,452 A | 6/1998 | Wolosewicz | | 2004/0022412 A1 | 2/2004 | Iwamura et al. |
| 5,778,102 A * | 7/1998 | Sandford et al. ............ 382/251 | | 2004/0101137 A1 | 5/2004 | Koto et al. |
| 5,801,687 A | 9/1998 | Peterson | | | | |
| 5,809,317 A | 9/1998 | Kogan | | | | |
| 5,818,441 A | 10/1998 | Throckmorton et al. | | | | |

2004/0117629 A1    6/2004    Koto et al.

FOREIGN PATENT DOCUMENTS

| EP | 058 482 | 8/1982 |
|---|---|---|
| EP | 372 601 | 6/1990 |
| EP | 411 232 | 2/1991 |
| EP | 441 702 | 8/1991 |
| EP | 493 091 | 7/1992 |
| EP | 581 317 | 2/1994 |
| EP | 629 972 | 12/1994 |
| EP | 650 146 | 4/1995 |
| EP | 705 025 | 4/1996 |
| GB | 2063018 | 5/1981 |
| GB | 2067871 | 7/1981 |
| GB | 2196167 | 4/1988 |
| GB | 2204984 | 11/1988 |
| JP | 4-248771 | 9/1992 |
| JP | 5-242217 | 9/1993 |
| JP | 7-108786 | 4/1995 |
| JP | 7-093567 | 9/1995 |
| WO | 89/08915 | 9/1989 |
| WO | 92/16913 | 10/1992 |
| WO | 94/27228 | 11/1994 |
| WO | 95/10835 | 4/1995 |
| WO | 95/14289 | 5/1995 |
| WO | 95/20291 | 7/1995 |
| WO | 96/01464 | 1/1996 |
| WO | 96/03736 | 2/1996 |
| WO | 96/19795 | 6/1996 |
| WO | 96/19821 | 6/1996 |
| WO | 96/27259 | 9/1996 |
| WO | 96/29749 | 9/1996 |
| WO | 96/36163 | 11/1996 |
| WO | 97/01137 | 1/1997 |
| WO | 97/02552 | 1/1997 |
| WO | 97/32262 | 9/1997 |

OTHER PUBLICATIONS

"Access Control and Copyright Protection for Images, WorkPackage 8: Watermaking," Jun. 30, 1995, 46 pages.

"Access Control and Copyright Protection for Images, WorkPackage 3: Evaluation of Existing Systems", Apr. 19, 1995, 68 pages.

"Access Control and COpyright Protection for Images, WorkPackage 1: Access Control and Copyright Protection for Images Need Evaluation," Jun. 1995, 21 pages.

Arachelian, "White Noise Storm," Apr. 11, 1994, Internet reference, 13 pages.

Arthur, "Digital Fingerprints Protect Artwork," New Scientist, Nov. 12, 1994, p. 24.

Bender et al., "Techniques for Data Hiding," Massachusetts Institute of Technology, Media Laboratory, Jan. 1995, 10 pages.

Boland et al., "Watermarking Digital Images for Copyright Protection," Fifth International Conference on Image Processing and its Applications, Conference Date Jul. 4-6, 1995, Conf. Publ. No. 410, pp. 326-330.

Boneh, "Collusion-Secure Fingerprinting for Digital Data," Department of Computer Science, Princeton University, 1995, 31 pages.

Brassil et al., Electronic Marking and Identification Techniques to Discourage Document Copying Proceedings of INFOCOM '94 Conference on Computer, IEEE Commum. Soc. Conference, Jun. 12-16, 1994, 1278-1287.

Brown, "S-Tools for Windows, Version 1.00, Copyrgt. 1994 Andy Brown, What is Steganography," Internet reference, Mar. 6, 1994, 6 pages.

Bruckstein, A.M.; Richardson, T.J., A holographic transform domain image watermarking method, Circuits, Systems, and Signal Processing vol. 17, No. 3, pp. 361-389, 1988. This paper includes an appendix containing an internet memo of Bell Labs, which according to the authors of the paper, was dated Sep. 1994.

Caronni, "Assuring Ownership Rights for Digital Images," Published in the Proceedings of 'Reliable it Systems,'vis '95, HH. Brug-germann and W. Gerhardt-Hackl (Ed.), Vieweg Publishing Company, Germany, 1995, Jun. 14, 1994, 10 pages.

Choudhury, et al., "Copyright Protection for Electronic Publishing over Computer Networks," IEEE Network Magazine, Jun. 1994, 18 pages.

Clarke, "Invisible Code Tags Electronic Images," Electronic Engineering Times, Jun. 12, 1995, n. 852, p. 42.

"The Copyright Can of Worms Opened up by the New Electronic Media," Computergram Internations, pCGN0717006, Jun. 17, 1995 and The Copyright Can of Worms Opened up by the New Electronic Media-2, Computergram Internations, pCGN07210008, Jun. 21, 1995, 3 pages.

"Copyright Protection for Digital Images, Digital Fingerprinting from FBI," Highwater FBI brochure, 1995, 4 pages.

"Cyphertech Systems: Introduces Digital Encoding Device to Prevent TV Piracy," Hollywood Reporter, Oct. 20, 1993, p. 23.

Dautzenberg, "Watermarking Images," Department of Microelectronics and Electrical Engineering, Trinity College Dublin, 47 pages, Oct. 1994.

de Castro et al., "Registration of Translated and Rotated Images Using Finite Fourier Transforms," IEEE Transactions on Pattern Analysis and Machine Intelligence, vol. PAMI-9, No. 5, Sep. 1987, pp. 700-703.

Fitzgerald, "Invisible Digital Copyright ID," Editor & Publisher, Jun. 25, 1994, p. 62.

"Foiling Card Forgers with Magnetic 'Noise'," Wall Street Journal, Feb. 8, 1994.

Friedman, "The Trustworthy Digital Camera: Restoring Credibility to the Photographic Image," IEEE Transactions on Consumer Electronics, vol. 39, No. 4, Nov. 1993, pp. 905-910.

Hartung et al., "Digital Watermarking of MPEG-4 Facial Animation Parameters," Computers & Graphics, vol. 22, No. 3, 1998, 17 pages.

Hartung et al., "Watermarking of Uncompressed and Compressed Video," Signal Process, vol. 66, No. 3, May 1998, pp. 283-301.

Hecht, "Embedded Data Glyph Technology for Hardcopy Digital Documents," SPIE vol. 2171, Feb. 1994, pp. 341-352.

"High Water FBI Limited Presentation Image Copyright Protection Software," FBI Ltd brochure, Jul. 1995, 17 pages.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM-23, No. 3, Mar. 1975, pp. 318-331.

JPEG Group's JPEG Software (release 4) ftp.csua.berekeley.edu/pub/cypherpunks/applications/jsteg/jpeg.announcement.gz, Jun. 7, 1993, 2 pages.

Kasssam, Signal Detection in Non-Gaussian Noise, Dowden & Culver, 1988, pp. 1-96.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20-22, 1995, 4 pages.

Komarsu et al., "A Proposal on Digital Watermarking in Document Image Communication and its Application to Realizing a Signature," Electronic and Communications in Japan, Part 1, vol. 73, No. 5, 1990, pp. 22-23.

Komatsu et al., "Authentication System Using Concealed Image in Telematics," Memoirs of the School of Science & Engineering, Waseda Univ., Nov. 52, 1988, pp. 45-60.

Kurak et al., "A Cautionary not on Image Downgrading," 1992 IEEE, pp. 153-159.

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 3 pages.

Macq, "Cryptology for Digital TV Broadcasting," Proceedings of the IEEE, vol. 83, No. 6, Jun. 1995, pp. 944-957.

Matsui et al., "Video-Steganography: How to Secretly Embed a Signature in a Picture," IMA Intellectual Property Project Proceedings, Jan. 1994, vol. 1, issue 1, pp. 187-205.

Matthews, "When Seeing is Not Believing," New Scientist, Oct. 16, 1993, pp. 13-15.

Mintzer et al., "Safeguarding Digital Library Contents and Users" Digital Watermarking, D-Lib Magazine, Dec. 1997, ISSN 1082-9873.

Moller, et al., "Rechnergestutzte Steganographic: Wie sie Funkioniert und warum folglich jede Reglementierung von Verschlusselung unsinning ist," DuD, Datenschutz and Datensicherung, 18/6 (1994) 318-326.

"Multimedia Mixed Object Envelopes Supporting a Graduated Fee Scheme via Encryption." IBM Technical Disclosure Bulletin: vol. 37, No. 03, Mar. 1994, p. 413.

"NAB—Cyphertech Starts Anti-Piracy Broadcast Tests," Newsbytes, NEW03230023, Mar. 23, 1994.

Nakamura et al. "A Unified Coding Method of Dithered Image and Text Data Using Micropatterns," Electronics and Communications in Japan, Part 1, vol. 72, No. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Quisquater et al., "Access Control and COpyright Protection for Images, Conditional Access and Copyright Protection Based on the Use of Trusted Third Parties," 1995, 43 pages.

Pennebaker et al., JPEG Still Image Data Compression Standard, Chapter 3, "Aspects of the Human Visual System," pp. 23 27, 1993, Van Nostrand Reinhold, New York.

Pitas et al., "Applying Signatures on Digital Images," IEEE Workshop on Nonlinear Image and Signal Processing, Neos Maramarus, Greece, pp. 460-463, Jun. 1995.

Port, "Halting Highway Robbery on the Internet," Business Week, Oct. 17, 1994, p. 212.

Proceedings: "Technological Strategies for Protecting Intellectual Property in the Networked Multimedia Environment"; Interactive Multimedia Association: Massachusetts Institute of Technology Program in Digital Open High Resolution Systems vol. 1 Issue 1 Jan. 1994 Journal of the Interactive Multimedia Association Intellectual Property Project.

Rindfrey, "Towards an Equitable System for Access Control and Control and Copyright Protection in Broadcast Image Services; The Equicrypt Approach," Intellectual Property Rights and New Technologies, Proc. of the Conference, R. Oldenbourg Verlag Wien Munchen 1995, 12 pages.

Roberts, "Picture Coding Using Pseudorandom Noise," IRE Trans. on Information Theory, vol. 8, No. 2, Feb. 1962, pp. 145-154.

Sanford II, et al., "The Data Embedded Method," SPIE vol. 2615, Oct. 23, 1995, pp. 226-259.

Sapwater et al., "Electronic Copyright Protection," Photo>Electronic Imaging, vol. 37, No. 6, 1994, pp. 16-21.

Schneier, "Digital Signatures, Cryptographic Algorithms Can Create Nonforgeable Signatures for Electronic Documents, Making Them Valid Legal Instruments" BYTE, Nov. 1993, pp. 309-312.

Schreiber et al., "A Compatible High-Definition Television System Using the Noise Margin Method of Hiding Enhancement Information," SMPTE Journal, Dec. 1989, pp. 873-879.

shaggy@phanton.com. "Hide and Seek v. 4.0" Internet reference, Apr. 10, 1994, 3 pages.

Sheng et al., "Experiments on Pattern Recognition Using Invariant Fourier-Mellin Descriptors," Journal of Optical Society of American, vol. 3, No. 6, 1986, pp. 71-776.

Short, "Steps Toward Unmasking Secure Communications," International Journal of Bifurcation and Chaos, vol. 4, No. 4, 1994, pp. 959-977.

Simmons, "Subliminal Channels: Past and Present," ETT, vol. 5, No. 4, Jul. 1-Aug. 1994, pp. 45-59.

Swanson et al., "Object-Based Transparent Video Watermarking," IEEE Signal Processing Society 1997 Workshop on Multimedia Signal Processing, Jun. 23-25, 1997, 8 pages.

Szepanski, "A Signal Theoretic Method for Creating Forgery-Proof Documents for Automatic Verfication," Proceedings 1979 Carnahan Conference on Crime Countermeasures, May 16, 1979, pp. 101-109.

Szepanski, "Additive Binary Data Transmission for Video Signals," Paper Presented at Conf. of Comm. Engineering Soc. Sep. 30-Oct. 1980, Technical Reports vol. 74, pp. 342-352.

Tanaka et al., "A Visual Retrieval System with Private Information for Image Database," Proceedings International Conference on DSP Applications and Technology, Oct. 1991, pp. 415-421.

Tanaka et al., "Embedding Secret Information Into A Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

"Technological Strategies for Protecting Intellectual Property in the Networks Multimedia Environment," Interactive Multimedia Assn: MIT Program on Digital Open Resolution Systems, vol. 1 issue 1, Jan. 1994 Journal of the Interactive Multimedia Assn Intellectual Property Project.

Tirkel et al., "Electronic Water Mark," DICTA-93, Macquarie University, Sydney, Australia, Dec. 1993, pp. 666-673.

Toga et al., "Registration Revisited," Journal of Neuroscience Methods, 48 (1993), pp. 1-13.

van Schyndel et al., "A Digital Watermark," IEEE International Conference on Image Processing, Nov. 13-16, 1994, pp. 86-90.

Wagner, "Fingerprinting," 1983 IEEE, pp. 18-22.

Walton, "Image Authentication for a Slippery New Age," Dr. Dobb's Journal, Apr. 1995, pp. 18-26, 82-87.

Weber et al., "Correlative Image Registration," Seminars in Nuclear Medicine, vol. XXIV, No. 4, Oct. 1994, pp. 311-323.

Wise, "The History of Copyright, Photographers' Rights Span Three Centuries," Photo>Electronic Imaging, vol. 37, No. 6, 1994.

Wu et al., Object-Based Multiresolution Watermarking of Images and Video, ISCAS 2000-IEEE International Symposium on Circuits and Systems, May 28-31, 2000, 2000 IEEE, pp. 1-212-1215.

Yeung et al., "Fragile Watermarking of Three-Dimensional Objects," 1988 IEEE, 5 pages.

Mar. 26, 2008 Office Action from assignee's U.S. Appl. No. 11/361,671.

Dec. 7, 2005 Notice of Allowance from assignee's U.S. Appl. No. 10/017,678.

Jul. 27, 2005 Office Action, and Jul. 29, 2005 Amendment in response thereto, each from assignee's U.S. Appl. No. 10/017,678.

Aug. 4, 2003 Office Action, and Jan. 5, 2004 Amendment in response thereto, each from assignee's U.S. Appl. No. 10/017,678.

Dec. 19, 2002 Office Action, and May 19, 2003 Amendment in response thereto, each from assignee's U.S. Appl. No. 10/017,678.

Sep. 7, 2001 Office Action, and Dec. 18, 2001 Amendment and Request Under 37 CFR 1.48(b) in response thereto, each from assignee's U.S. Appl. No. 09/597,209.

Mar. 11, 2002 Notice of Allowance and Dec. 5, 2001 Interview Summary (with 2 attachments) from assignee's U.S. Appl. No. 09/597,209.

Aug. 25, 2006 Notice of Allowance, Aug. 30, 2005 Amendment Accompanying RCE, Jun. 3, 2005 Notice of Allowance, each from assignee's U.S. Appl. No. 09/404,292.

Dec. 8, 2004 Office Action, and May 9, 2005 Amendment in response thereto, each from assignee's U.S. Appl. No. 09/404,292.

Mar. 3, 2004 Office Action, and Aug. 3, 2004 Amendment in response thereto, each from assignee's U.S. Appl. No. 09/404,292.

May 20, 2003 Office Action, May 13, 2003 Interview Summary, and Feb. 10, 2004 Amendment in Response to Notice of Non-Compliant Amendment, each from assignee's U.S. Appl. No. 09/404,292.

Feb. 27, 2007 Examiner Interview Summary, Mar. 3, 2007 Notice of Allowance, and Jun. 7, 2007 Applicant's Interview Summary (including proposed amendment), each from assignee's U.S. Appl. No. 09/810,080.

Nov. 3, 2006 Office Action, Nov. 27, 2006 Amendment, Nov. 29, 2006 Examiner Interview Summary, each from assignee's U.S. Appl. No. 09/810,080.

Nov. 2, 2005 Office Action, Mar. 7, 2006 Amendment, May 31, 2006 Office Action, and Jun. 27, 2006 Amendment After Final Rejection, each from assignee's U.S. Appl. No. 09/810,080.

May 4, 2005 Office Action, and Aug. 4, 2005 Amendment Accompanying RCE, each from assignee's U.S. Appl. No. 09/810,080.

Aug. 10, 2004 Office Action, and Dec. 10, 2004 Amendment, each from assignee's U.S. Appl. No. 09/810,080.

Hartung, et al., "Digital Watermarking of Raw and Compressed Video," Digital Compression Technologies and Systems for Video Communication, pp. 205-213, Oct. 1996.

* cited by examiner

DIGITAL WATERMARKING SYSTEMS AND METHODS

RELATED APPLICATION DATA

The present application is a division of U.S. patent application Ser. No. 10/278,742, filed Oct. 21, 2002 (published as US 2003-0138127 A1), which claims the benefit of U.S. Provisional Patent Application No. 60/349,970, filed Oct. 19, 2001. The present application is also a continuation-in-part of co-pending U.S. patent application Ser. No. 10/017,678, which is a continuation of U.S. patent application Ser. No. 09/597,209 (now U.S. Pat. No. 6,411,725). The Ser. No. 09/597,209 application is a continuation-in-part of U.S. patent application Ser. No. 09/408,902 (now U.S. Pat. No. 6,408,331), which is a division of U.S. patent application Ser. No. 09/130,624 (now U.S. Pat. No. 6,324,573), which is a continuation of U.S. patent application Ser. No. 08/508,083 (now U.S. Pat. No. 5,841,978).

BACKGROUND AND SUMMARY OF THE INVENTION

In a recent article, "Paranoid Hollywood Wracked by Hack Attacks," author Marc Graser reported that "[h]ollywood is experiencing the revelation that everything it saves on a computer is available to prying eyes at any time. Nothing is safe. Paranoia is running rampant. Through legal (and freely accessible) software, anyone with a computer and an Internet connection can enter studio databases containing the most private information." (Reuters distributed Graser's article on Aug. 8, 2001.).

Graser continued "[r]ecent breaches have allowed hackers to exchange: rough-cuts of Warner Bros.' "Ocean's 11" and Columbia Pictures' Jet Li actioner "The One"; emails among executives at Warner Bros. TV; scripts transferred from production companies such as Bruckheimer Films; databases at agencies like Creative Artists Agency, Endeavor and William Morris; personal records at law corporations and accounting offices; and digitally stored media at New Line and VDI Multimedia." (See id.).

Piracy is raking showbiz in the tune of $1 trillion in damages annually. The film industry is losing $2.5 billion a year to piracy and the music industry is losing an additional $4.1 billion per year. (See id.).

Yet the biggest threat comes from money-hungry professionals, and company employees are increasingly to blame. See id. Graser reports that most companies do not realize that 90% of the attacks performed on the systems they try so hard to protect are the result of inside jobs.

A solution is needed to help curve the onslaught of movie theft and piracy, particularly theft from film studios and editing facilities.

Digital Watermarking can provide a deterrence and tracking solution.

Digital watermarking technology, a form of steganography, encompasses a great variety of techniques by which plural bits of digital data are hidden in some other object, preferably without leaving human-apparent evidence of alteration.

Digital watermarking may be used to modify media content (audio, video, images, etc.) to embed a machine-readable code into the media content. The media may be modified such that the embedded code is imperceptible or nearly imperceptible to a viewer, yet may be detected through an automated detection process.

There are many processes by which media content can be processed to encode a digital watermark. In media (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present Assignee's U.S. Pat. No. 6,122,403 and application Ser. No. 09/503,881 (now U.S. Pat. No. 6,614,914) are illustrative of certain watermarking technologies. Of course, artisans in the digital watermarking field are familiar with other technologies that are suitably interchangeable with some aspects of the present invention.

Digital watermarking systems typically have two primary components: an embedding component that embeds a watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The Assignee's U.S. patent application Ser. Nos. 09/503,881 (now U.S. Pat. No. 6,614,914) and 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

To provide a comprehensive disclosure without unduly lengthening this specification, each of the patents and patent applications cited in this document are hereby incorporated by reference.

In one implementation of the invention, we provide steganographic markings for studio rough cuts. The marks provide nearly imperceptible identification and forensic tracking clues.

In another implementation, content is marked with serialized or unique codes efficiently using different objects for the content and watermark data via object based encoding systems such as MPEG-4. The watermark object can be efficiently created if the original compressed content is analyzed and perceptual model results and calibration signals that are constant when a watermark payload is changed are saved. This or another forensic embedding system can be used to track content as well as lock content to a recipient. For example, the content may be rendered only if the individual or their rendering device has a secret code that coincides with the embedded ID.

With the foregoing by way of background and summary, the specification next turns to various digital watermarking improvements. It will be recognized that these improvements can typically be employed in many applications, and in various combinations with the subject matter of the patent documents cited herein. These improvements will be more readily apparent from the following detailed description, which proceeds with reference to the accompanying drawings.

DETAILED DESCRIPTION

Figure 1:
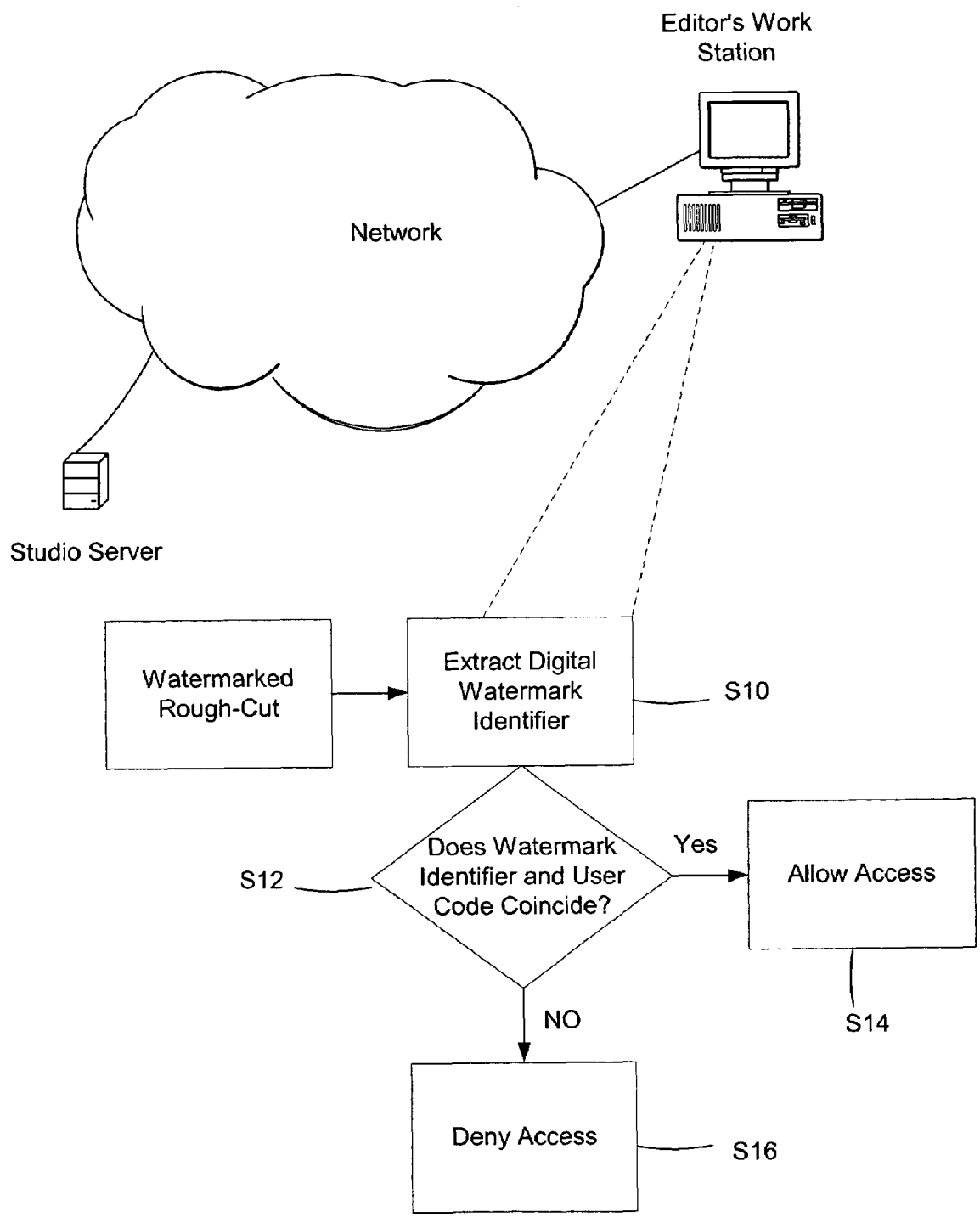
FIG. 1 is a diagram illustrating a network system, including a flow diagram for a security procedure.

Consider a typical film production process. After shooting on location, the resulting film is digitized or converted to a digital format. (Or digital images can be initially captured. Of course, there are special effects and other effects filters (e.g., a flame effect filter) that are essentially produced in the digital domain.). The digitized film (and any special effects scenes) represents the many scenes that will be edited to create a movie, video or other viewing program. We refer to this collection of digital scenes as a "master cut." This master cut can be further refined into so-called rough-cuts, in which a movie sequence begins to take shape.

Often, rough-cuts are provided to editors and effects specialists. Similarly, rough-cuts are often provided to directors, critics, executives, advertisers, etc. One aspect of the present invention helps to identify and track rough-cuts as they are distributed from a studio.

A conventional security feature provides a digital "bug" or label that visually appears in a corner (or other) screen position of a rough-cut. Or the rough-cut includes a visible banner-like text message throughout each scene or frame. These techniques are easily defeated by pirates through simple cropping and editing techniques.

According to one aspect of the present invention, a rough-cut is digitally watermarked, particularly when communicated to a non-secure location. Even rough-cut copies that are "checked-out" as a file, instead of rendering (or streaming) to a network workstation, can be digitally watermarked. The digital watermark is preferably redundantly embedded throughout the rough-cut, or the watermark can be placed in only specific frames or placed to cover certain film segments or video objects. Preferably, the digital watermark includes an identifier. Suitable watermarking techniques are disclosed in the applications and patents mentioned above. In some implementations, other digital watermarking techniques can be suitably interchanged with this aspect of the present invention, so long as the watermark conveys sufficient payload capacity.

A digital watermark identifier preferably uniquely identifies a rough-cut version (e.g., cut 1 of 12, date/time, editing details, distribution trail, etc.). Alternatively (or additionally), the identifier uniquely identifies a party to which the rough-cut is being transferred. The identifier is stored in a database or other record to facilitate tracking. The identifier is associated in the database with information relating to the rough-cut or to the receiving party. (The data record can include additional information such as time of rough-cut checkout, distribution/rendering channel, usage restrictions, etc.). Thereafter, when the rough-cut is found in an unexpected or unauthorized location, e.g., a web site, video store shelf, competitor's studio, counterfeited DVD, etc., the embedded watermark identifier is extracted and used to interrogate the database. The database information is retrieved and the source of the leak or distribution channel can be identified.

In another embodiment, the identifier is used as a security feature to prevent unauthorized viewing or handling. With reference to FIG. 1, a rough-cut is transferred from a network studio to a user workstation (e.g., editor, director, etc.) via a network. The transfer can occur through a conventional network, such as a wide area network, local area network, private network, wireless network, or even the Internet. Alternatively, the user receives the rough-cut on physical media. The rough-cut includes a digital watermark embedded therein. Of course, a digital watermark can be redundantly embedded throughout the cut.

Access to the rough-cut is regulated by a software security application operating on the user's workstation. The software security application can be integrated with software editing tools such as Adobe Premier, Affects Effects and Media100 products, among others. The security software preferably includes (or cooperates with) a digital watermark reader. The reader can be a plug-in or an independent software application. The watermark reader extracts the digital watermark identifier (S10) from the rough-cut and the user is prompted to enter a corresponding code. The code is preferably rough-cut specific in that a user has (or receives from a studio) a code that corresponds only to a digital watermark identifier embedded in her rough-cut. Once entered, the watermark detector determines whether the identifier and code coincide (S12). If the code and watermark identifier coincide, the user is granted access to the rough-cut (S14). Else, the user is denied access (S16). The code and watermark ID need not perfectly match to coincide. Indeed, the code and identifier can be related via a hash, mathematical relationship or algorithm. Or the code/identifier can be related by a symmetrical or asymmetrical encryption key.

In other implementations, the code is cached on the editor's computer (or video rendering device), e.g., like storing so-called web cookies that securely store account IDs and passwords on a user's terminal, so the code does not need to be manually entered each time. In addition, the code can be locked (or tied) to a computer, such as including the date of a Windows garbage can. In one implementation, the computer is secure, requiring the user to enter a password and/or pass biometrics, such as a fingerprint scan or security dongle or card, such that other users do not have access to the cached ID. In other words, only a specified user can use the cached ID, even though it is stored on the PC since the cache is locked for access only by a qualifying PC user. In another implementation, the code is implicitly part of a computer system, such as a private cryptography key. In this case, the code is used to decrypt or otherwise unscramble the rough-cut or the digital watermark embedded in the rough cut or both.

As will be appreciated, an editing process typically involves the creation of an instruction set, which is used to create a final cut. The instruction set outlines (e.g., by codes or markers) the editor's edits, cuts, etc. Most often the instruction set is applied against a high quality cut to create the final cut (or further rough-cuts). Of course, a final cut can likewise be watermarked.

In still another implementation of this aspect of the present invention, an editor's rendering device (e.g., personal computer executing editing software instructions, set-top-box or other device) embeds a watermark identifier in a rough-cut. The identifier is preferably unique to the editor or to a team of editors. Accordingly, if the rough-cut is discovered in an unanticipated or unauthorized channel, the watermark identifier, once extracted, can be used to track the source of the leak.

Consider a modification of this implementation for adaptation to a peer-to-peer (P2P) network environment. When presenting a pre-release movie clip in a P2P network, e.g., like x-ShareThis, every ShareThis client that handles (or routes) the movie clip digitally watermarks the clip with a unique identifying watermark (e.g., a unique serial number, etc.). Illegal or unauthorized copies of the movie clip can be traced through the peer lineage of the unique identifiers.

Transactional Watermarks: A System Level Approach

Forensic tracking can be facilitated by watermarking each version or content copy with a transaction ID. Content is defined broadly herein and may include audio, video, data, images or multimedia combinations. A transaction (or dynamic) identifier preferably includes multi-bit data that uniquely identifies a user, a user device or a transaction. In some cases the transaction identifier serves as a database interrogator to retrieve additional information. (Forensic tracking involves identifying content and/or tracking a distribution source or history of the content. Forensic tracking can also involve uniquely serializing content to a user or user device. Forensic tracking is particularly helpful in identifying content or a distribution source when the content is discovered in an unexpected or unauthorized channel or location.). A content owner may want a serial account of each content copy, or to tie the content to an end-user or playing device ID. This requirement means that the content is preferably watermarked on the fly at the server with video streamed over IP, or at a set-top box (STB) in broadcast video system.

Some robust watermark embedding algorithms are too computationally intensive for this approach and/or adversely degrade content. For broadcast video, a set-top-box (STB) is designed to be as inexpensive as possible, but for use in a watermark embedding/decoding system, the STB must contain enough computational resources for a watermark embedder and/or decoder. For video streamed over IP, compressed content is often digitally watermarked on a server, which may require the content to be decompressed, watermarked and re-compressed. These steps are not only computationally intense but may also degrade the content.

Looking at a complete system, we have invented improvements for efficiently embedding a transaction ID in content. Our improvements are discussed below.

Watermarking Compressed Content

Digitally watermarking compressed audio, video or images, where a watermark ID can dynamically change (e.g., potentially to identify a user, transaction or requesting/rendering device), presents computational and content degradation (due to a re-compression) challenges. Conventional approaches often require content to be decompressed, watermark and recompressed.

Our improvements and solutions to these challenges are expressed in the following two embodiments.

First Embodiment

Our first embodiment is discussed with reference to FIG. 2. Compressed content 100 is decompressed 110. A watermark including a dynamic identifier 140 is determined (or constructed) for the decompressed content 120. Preferably, a dynamic identifier (or transaction identifier) uniquely identifies a particular user or user device. Or the dynamic identifier can be unique to a particular transaction in a receipt-like manner. Optionally, the dynamic identifier is associated in a database with additional information such as user information, distribution channel, content usage rights, transaction details, account information, etc. (Once decoded, the dynamic identifier is used to interrogate the database to retrieve the additional information.). The watermark is compressed as a separate object 130, such as defined in MPEG-4, without being embedded in the decompressed content. Two objects—namely the original compressed content and the compressed watermark—are communicated to a rendering device (e.g., personal computer, media player, set-top-box, DVD, or other consumer device) 150. In one example, a copy of the original compressed content 100 is retained, so as to avoid recompressing the decompressed original content. The objects can be communicated via a network, such as the Internet or a LAN or WAN. In a network environment, steps 100-140 are preferably carried-out on a network server.

The rendering device combines the two objects 160. For example, the objects can be decompressed and the content can be embedded with the watermark by a watermark embedded associated with the rendering device. The watermark object can include embedding hints, such a spatial or frequency-embedding clues, start sequences or points, etc. Or the two objects can be associated or linked together, e.g., with a header or file structure. Still further, the content and watermark can be otherwise combined, e.g., during rendering or storing.

The first embodiment associates a dynamic ID with content without recompressing the original content. The decompressed content 110 can be optionally saved on the network server so that the decompressing step is skipped for following transactions involving the same original content, thus reducing computational requirements.

Although not required, it is preferable that the two objects, i.e., the original compressed content and the compressed watermark, are delivered as a secure stream to a secure player (or rendering device) so that a would-be pirate cannot restrict or separate the watermark from the content.

Second Embodiment

Figure 2:
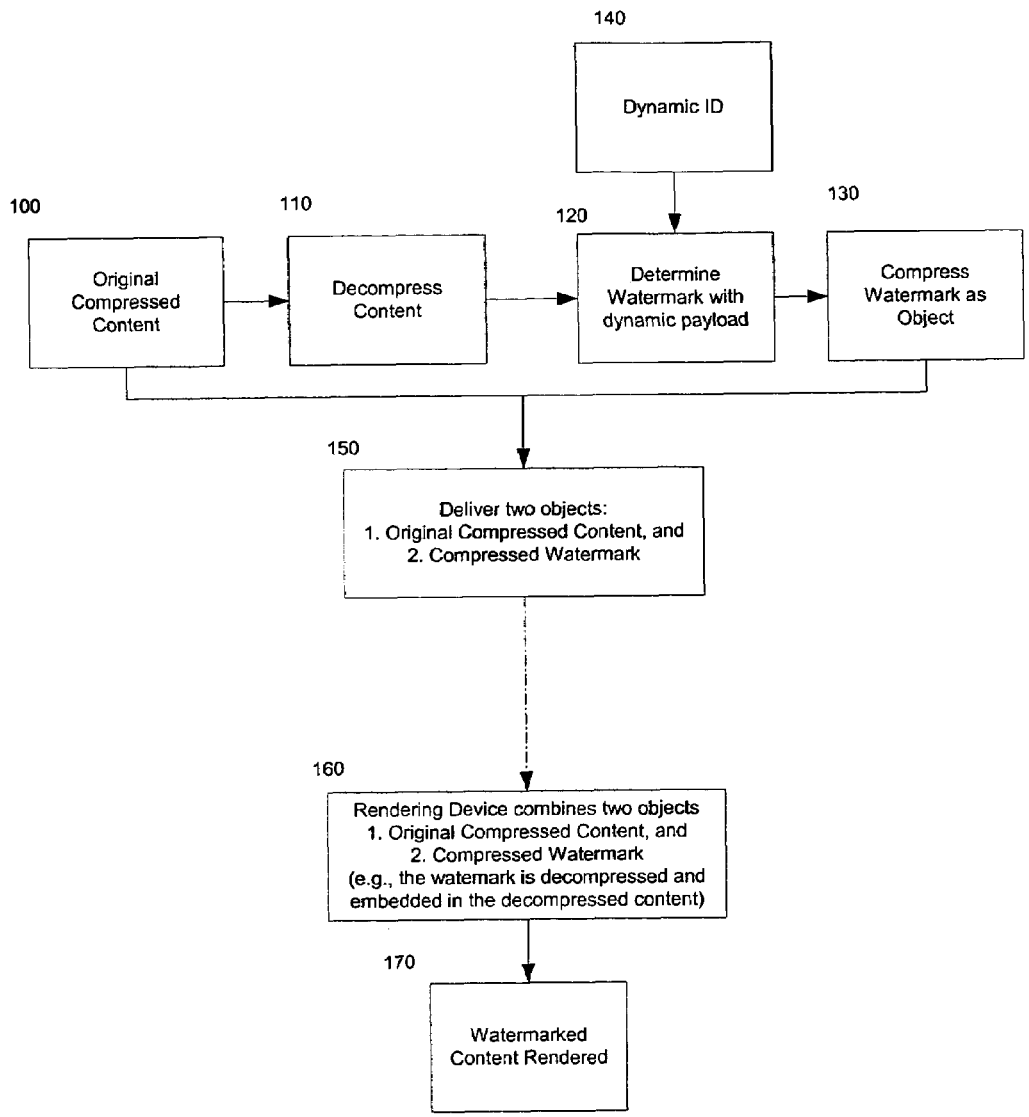
FIG. 2 is a block diagram illustrating a transaction procedure.

Our second embodiment is described with reference to FIG. 3, where like stages/steps are numbered with the same reference numbers as shown in FIG. 2. This embodiment includes a pre-computation stage, where original compressed content 100 is decompressed 110. Static watermark features and/or embedding instructions are determined 220. For example, the static watermark signal many include features based on perceptual modeling of the content, or may include watermark orientation or reference signals. The watermark features (e.g., perceptual model and/or orientation signal) are saved in a related file 230. Preferably, the related file contains those watermarking features that do not change when the transactional (or dynamic) ID changes. With these features saved in related file 230, the original content does not need to be again de-compressed. Overall computational time can be reduced by saving such a related file in the pre-computational stage. This related file 230 is preferably saved for future requests for the same original content 100, saving additional computational time.

Then, in a transaction stage, where the content 100 is delivered to a user, a watermark is efficiently created 120 using the related file 230 (including the perceptual model and/or orientation signal). The watermark preferably includes a watermark identifier based on a dynamic ID 140. As in the first embodiment, the dynamic or transactional ID uniquely identifies the user, user device or the transaction. The watermark is compressed 130 and sent as an object with the original compressed content 150 as discussed above with respect to FIG. 2. As such, in the transaction stage, the original compressed file need not be decompressed. In other words, the content file needs to be decompressed and analyzed for perceptual features only once, while the distributed versions can be watermarked with numerous IDs.

Additionally, in step 160, the watermark can efficiently be read before being added to the content. This reading will be very efficient and robust. Even if the watermark is read after being combined with the content, the watermark ID can be used to produce so-called hot-branding, where a related central database produces a dynamic brand logo to appear with the content, such as a logo in video or images and audio with audio.

Modifications

We also envision that the original compressed content may be encrypted. When encrypted, decryption does not have to be performed, except initially in the pre-computational stage when the related file 230 is created. This is both more efficient and more secure than having to decrypt the content to add the watermark during each subsequent transaction. As with the first embodiment, if the decompressed content is saved, the system is more efficient, but not necessarily more secure since non-secure content is available on the server.

Figure 3:
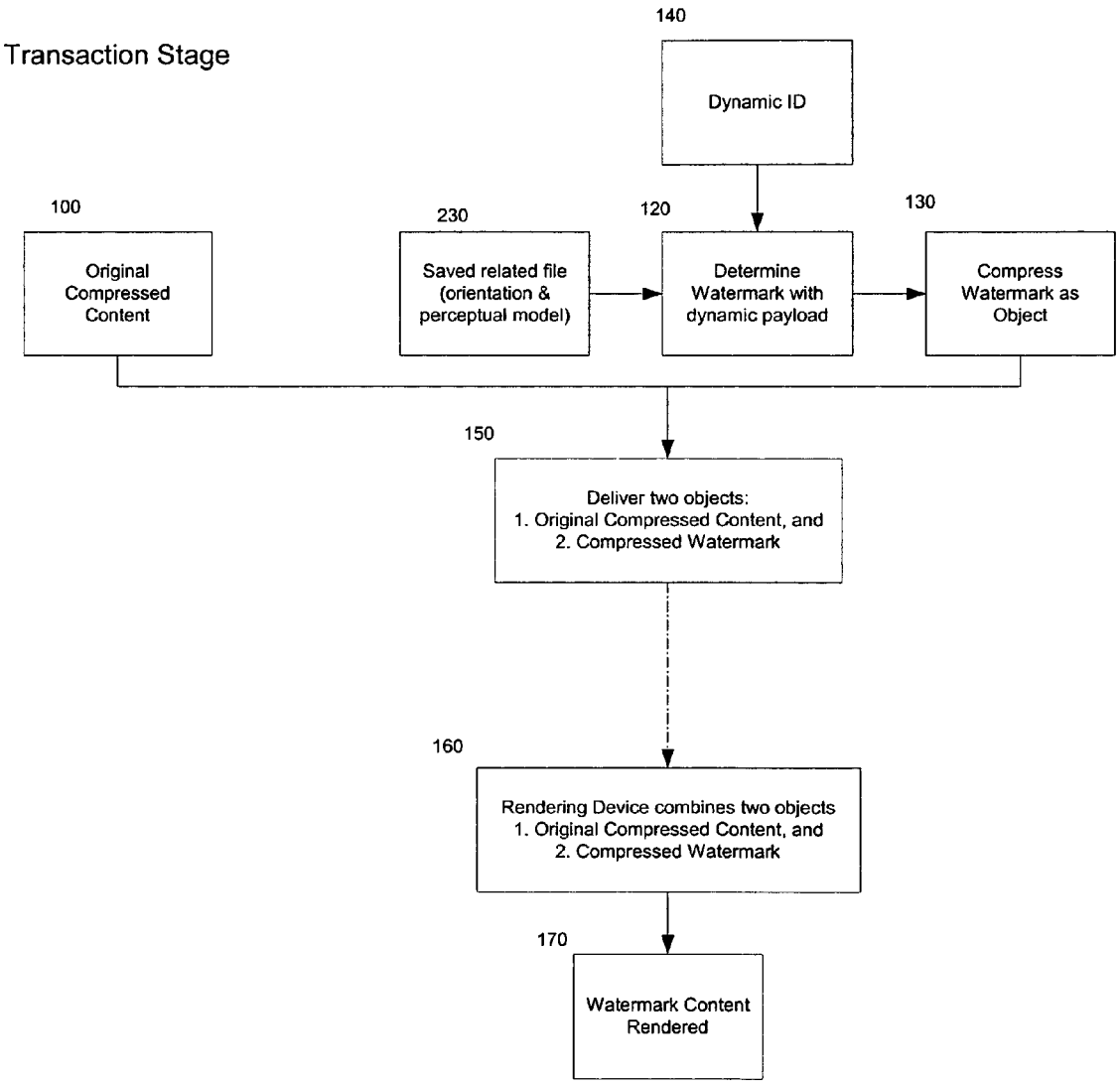
FIG. 3 is a block diagram illustrating another transaction procedure, include a pre-computational stage.

As an optional feature for the FIG. 2 and FIG. 3 embodiments, the content is embedded with a watermark content ID, and optionally with a distributor ID, before it is broadcast or streamed. This process need only occur once and not each time it is streamed. For example, a watermark-embedding step is included after decompression 110. Or the illustrated transaction processes act on compressed content that has been previously watermarked. The individual dynamic or transaction ID is then determined according to the FIG. 2 and FIG. 3 embodiments.

As will be appreciated, in the FIG. 2 and FIG. 3 embodiments, the original content and watermark objects are securely combined at a rendering device, thus creating a uniquely identified content display (e.g., such as a video display).

It also should be appreciated that the FIG. 2 and FIG. 3 transaction systems are envisioned to handle many transfers of the same original content to many different users (or rendering devices). A unique dynamic or transaction identifier is preferably generated for each transfer or for each user.

With reference to FIG. 2, in an alternative embodiment, the original content 100 includes a digital watermark, and the watermark is extracted and supplemented with a dynamic (or transactional) identifier in step 120.

Conclusion

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, each of the above-mentioned patents and patent applications, along with U.S. patent application Ser. Nos. 09/574,668 (now U.S. Pat. No. 6,522,769), Ser. Nos. 09/620,019, 09/636,102, 60/257,822, and Ser. No. 09/574,668 (now U.S. Pat. No. 6,522,769), are hereby incorporated by reference. Applicants also herein incorporate by reference Assignee's U.S. Patent Application titled "Integrating Digital Watermarks in Multimedia Content," filed concurrently herewith (now application Ser. No. 10/277,617, published as US 2003-0103645 A1). The particular combinations of elements and features in the above-detailed embodiments are exemplary only; the interchanging and substitution of these teachings with other teachings in this application and the incorporated-by-reference patents/applications are expressly contemplated.

Many of the above-described methods and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Also, instead of software, a hardware implementation, or a software-hardware implementation can be used.

While the first aspect of the present invention has been described with respect to editor rough-cuts, the invention is not so limited. Indeed, any movie segment, trailer, preview, or confidential documents can be watermarked. Also, while the rough-cuts are described as if in a digital format, they need not be so. Instead, the rough-cuts can be film, which includes a digital watermark identifier embedded therein. It also should be appreciated that the watermark embedding can occur while the rough-cut is being rendered.

Also, a studio rough-cut can include a plurality of watermarks. For example, the rough-cut may include a content identifying watermark, which uniquely identifies the content, and a user specific watermark, which uniquely identifies the user. The studio rough-cut can also include a so-called semi-fragile digital watermark. A semi-fragile watermark is designed such that it can withstand routine signal processing (e.g., compression) but is destroyed or degrades predictably with a malicious attack. The status of a fragile watermark in a studio rough-cut will help to announce a copy.

In view of the wide variety of embodiments to which the principles and features discussed above can be applied, it should be apparent that the detailed embodiments are illustrative only and should not be taken as limiting the scope of the invention.

What is claimed is:

1. A method of associating a watermark with a compressed video object, said method comprising:
   decompressing the video object;
   determining a digital watermark signal for the decompressed video object, but instead of embedding the determined digital watermark signal in the decompressed video object, compressing the digital watermark signal as an object; and
   associating the digital watermark object and the compressed video object.

2. The method of claim 1, further comprising:
providing the associated video object and digital watermark object to a rendering device.

3. The method of claim 2, wherein the rendering device is to decompress the video object and decompress the digital watermark object, and then embed the decompressed digital watermark into the decompressed video, the embedding occurring prior to rendering of the video.

4. The method of claim 3, wherein the digital watermark comprises at least one of an orientation component and perceptual model of the video, and wherein the embedding is to use at least one of the orientation component or perceptual model.

5. The method of claim 4, wherein the embedding is to use both of the orientation component and perceptual model.

6. The method of claim 1, wherein the digital watermark object is to be detected independently of the video object.

7. The method of claim 1, wherein the digital watermark object and the video object each comprise MPEG-4-based objects.

8. The method of claim 1, wherein the digital watermark comprises a unique identifier.

9. A rendering device comprising:
an input;
an output;
electronic processing circuitry; and
electronic memory circuitry having executable instructions stored thereon, said instructions for execution by said electronic processing circuitry, said instructions comprising instructions to:
decompress compressed video received by said input;
decompress a compressed digital watermark received by said input, wherein the digital watermark corresponds to the video; and
steganographically embed the decompressed digital watermark into the decompressed video, the embedding occurring prior to or upon rendering of the video via said output.

10. The device of claim 9, wherein the compressed video and the compressed digital watermark are received together at said input.

11. The device of claim 9, wherein the digital watermark comprises at least one of an orientation component or perceptual model of the video, and wherein said instructions to steganographically embed employ at least one of the orientation component and perceptual model.

12. The device of claim 11, wherein said steganographically embedding instructions employ both of the orientation component and perceptual model.

13. The device of claim 9, wherein the compressed digital watermark and the compressed video each comprise MPEG-4-based objects.

14. The device of claim 9, wherein the digital watermark comprises a unique identifier to identify at least one of the video and rendering device.

15. The method of claim 1 wherein the video object and the digital watermark object comprise separate objects.

16. The device of claim 9 wherein the compressed video and the compressed digital watermark comprise separate objects.

* * * * *